United States Patent [19]
Burkel et al.

[11] Patent Number: 4,611,507
[45] Date of Patent: Sep. 16, 1986

[54] AUTOMOTIVE GEARSHIFT JOLT MINIMIZATION SYSTEM

[75] Inventors: Rainer Burkel, Asperg; Alfred Müller, Gröbenzell; Cornelius Peter, Stuttgart; Manfred Schwab, Gerlingen, all of Fed. Rep. of Germany

[73] Assignee: Robert Bosch GmbH, Stuttgart, Fed. Rep. of Germany

[21] Appl. No.: 713,567

[22] Filed: Mar. 18, 1985

Related U.S. Application Data

[63] Continuation of Ser. No. 436,612, Oct. 25, 1982.

[30] Foreign Application Priority Data

Feb. 18, 1982 [DE] Fed. Rep. of Germany ....... 3205767

[51] Int. Cl.$^4$ .............................................. B60K 41/18
[52] U.S. Cl. ........................................ 74/866; 74/862
[58] Field of Search ................. 74/866, 862, 867, 868, 74/752 A

[56] References Cited

U.S. PATENT DOCUMENTS

| | | | |
|---|---|---|---|
| 3,710,651 | 1/1973 | Marumo et al. | 74/866 X |
| 3,748,926 | 7/1973 | Mohri et al. | 74/866 X |
| 3,750,495 | 8/1973 | Ito et al. | 74/866 |
| 3,942,393 | 3/1976 | Forster et al. | 74/867 X |
| 4,033,202 | 7/1977 | Ahlen et al. | 192/103 R X |
| 4,172,505 | 10/1979 | Rabus et al. | 74/862 X |
| 4,228,700 | 10/1980 | Espenschied et al. | 74/866 |
| 4,334,441 | 6/1982 | Iwanaga et al. | 74/868 |
| 4,351,205 | 9/1982 | Fischer | 74/866 |
| 4,360,092 | 11/1982 | Muller et al. | 192/12 C |
| 4,373,619 | 2/1983 | Schritt et al. | 74/866 X |

FOREIGN PATENT DOCUMENTS

| | | | |
|---|---|---|---|
| 2843183 | 4/1980 | Fed. Rep. of Germany . | |
| 2051979 | 1/1981 | United Kingdom | 74/866 |
| 2080910 | 2/1982 | United Kingdom | 192/3.58 |

Primary Examiner—Kenneth J. Dorner
Assistant Examiner—D. Wright
Attorney, Agent, or Firm—Frishauf, Holtz, Goodman & Woodward

[57] ABSTRACT

To control the pressure p of an operating fluid in an automatic transmission (12), the input speed and output speed ($n_T$, $n_{out}$) of the transmission is sensed, and the pressure (p) is so controlled by a control unit (21) that the transmission ratio which is actually coupled by the transmission, in view of the pressure set by the friction bands, is carried out in accordance with a predetermined timing function ($i_{com}$), for example as stored in a read-only memory (ROM, 24). Change in shifting characteristics can be obtained, for example, by operator-selected different time-engagement relationships to obtain maximum passenger comfort or maximum acceleration, or intermediate relationships.

6 Claims, 3 Drawing Figures

AUTOMOTIVE GEARSHIFT JOLT MINIMIZATION SYSTEM

This application is a continuation of application Ser. No. 436,612, filed Oct. 25, 1982.

Reference to related literature:
German Patent Disclosure Document DE-OS No. 28 43 183, WILL;
German Patent Disclosure Document DE-OS No. 29 13 824 to which U.S. application Ser. No. 128,522, filed Mar. 10, 1980, Muller, assigned to the assignee of the present application, now U.S. Pat. No. 4,360,092 issued Nov. 23, 1982 corresponds.

The present invention relates to automotive automatic transmissions, and more particularly to a control system therefor which provides for controlled engagement of gears as shifting is carried out.

BACKGROUND

Automatic stepped transmissions for automotive use customarily employ hydraulic fluid which controls the engagement of operating elements within the transmission, e.g. by tightening friction bands or the like. The pressure of the operating fluid, hereinafter and for simplicity called the transmission fluid, can be controlled in dependence on various operating parameters. Under most customary operating conditions, the pressure is set to depend on loading of the engine; it has also been proposed to include vehicle speed as an operating parameter.

Pressure of the operating hydraulic fluid can be controlled also in another manner, for example by introducing a parameter representative of engine speed as well as drive speed, or input speed of a shaft to the transmission. The referenced German Patent Disclosure Document DE-OS No. 28 43 183 describes such a system. In addition, it is known to change the operating pressure of the friction band in the transmissions in dependence on other parameters, for example on developed drive torque. This, however, requires extensive and complex sensing apparatus.

The various systems which have been proposed require sensors which, at times, are difficult to fit into an automotive vehicle, or sensors which do not provide output signals which unambiguously characterize the required parameters which are desirable to control the operating pressure of the hydraulic fluid in an automatic transmission.

THE INVENTION

Briefly, it is an object to provide a control system which can receive input signals which can be readily sensed and are easily available within an automotive vehicle, or a transmission therefor, and which permits matching of the engagement pressure of the automatic transmission to desired requirements.

Briefly, the input speed to the transmission is determined, and a corresponding signal $n_T$ is derived. This may be a signal which can be obtained from the output shaft of a hydraulic turbine, such as a torque converter coupled to the engine of the vehicle. Further, a signal $n_{out}$ is obtained, representative of the speed of the output shaft of the transmission. A pressure control means controls the pressure of the pressure fluid controller of the transmission, the pressure control means, in turn, providing its output control signals under command of a timing circuit which controls engagement pressure, and hence the transition between the slippage and positive drive in accordance with a predetermined timing function.

The system has the advantage that the control parameter, namely the transmission ratio, as represented by input and output speed to the transmission, exactly characterizes the change in the gearing, and thus the parameters based on transmission operation can be easily sensed and will be directly representative of those data which characterize the entire switching change. The sensors which are used are inexpensive and reliable, since only speed sensors are required. To determine output speed of the transmission, only a simple sensor is needed since the change in output speed, during a gear change, is only small. The control system, additionally, has the advantage that it is independent of the then pertaining operating state of the engine, for example its torque output.

In accordance with a preferred embodiment of the invention, the timing of the gear change is controlled in two steps, in which a first step is positively controlled and lasts until the tree wheeling point is reached that is, that point or operating condition within the transmission in which the friction elements of the previously engaged gears have been disconnected, and the engagement pressure for the newly engaged gear is then controlled in accordance with predetermined timing functions, for example as stored in a memory, such as a read-only memory (ROM) which can be matched to the transmission ratio to be engaged.

If the respective change between gear ratios in sequential transmission steps is similar, or if the steps are appropriately matched, provision of command signals for control of pressure is particularly simple. Overall, however, control based on input and output speed to the transmission and timing of the operation of the pressure controller for the friction band of the newly engaged transmission permits simple control and thus operation of the transmission with utmost reliability.

DRAWINGS

FIG. 1 is a schematic block circuit diagram of an embodiment of the system in accordance with the invention; and FIGS. 2 and 3 are timing diagrams illustrating the operation of the system of FIG. 1.

DETAILED DESCRIPTION

Figure 1:
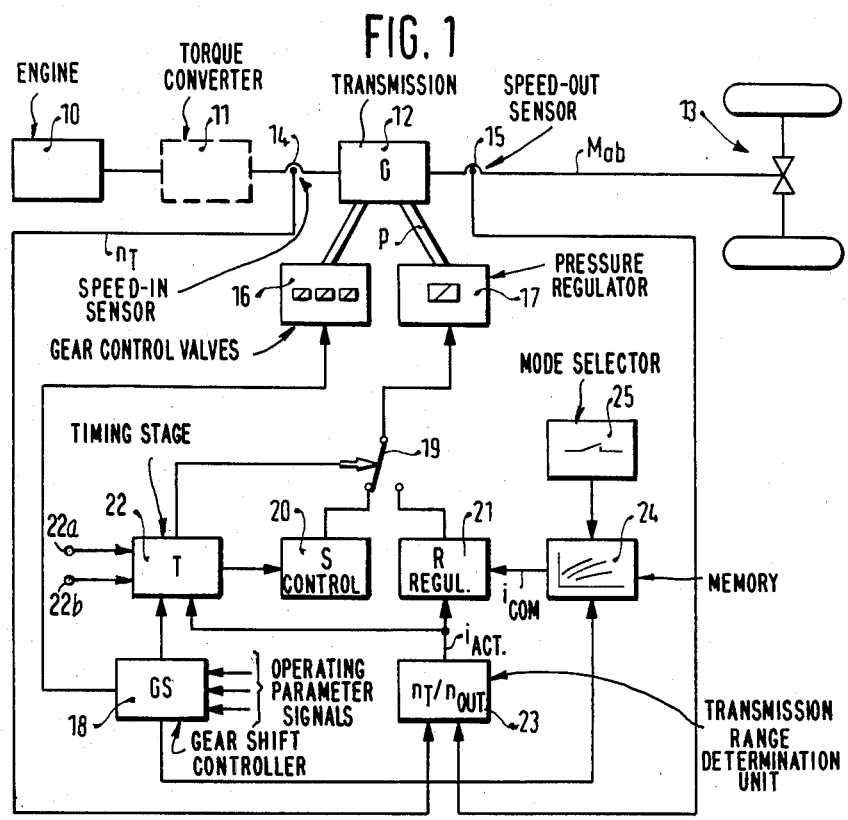

An engine 10, for example any standard engine of an automotive vehicle, is connected to a torque converter 11. The torque converter 11 is not strictly necessary, and therefore it is shown in broken lines. The engine 10, then, through the torque converter 11 or directly, is connected to a step-type or gear change type automatic transmission 12. The output of the transmission 12 is connected to a differential and wheels of a vehicle, as well known, and is only schematically indicated at 13.

The input and the output to the transmission 12 each has a speed sensor 14, 15 applied thereto. Sensor 14, which may be termed the input speed or speed-in sensor, provides an output signal $n_T$, representative of input speed to the transmission or turbine speed thereof. Sensor 15, which is the speed-out sensor, provides an output signal $n_{out}$. The transmission 12 is controlled to engage respective transmission gear ratios by gear switching or gear changing valves 16 which, by respectively being enabled, engage a specific gear ratio to be commanded. Further, the transmission includes a pressure regulator 17 in which the friction bands of the automatic transmission 12 are controlled by setting a suitable engagement pressure p thereof.

The gear control valves 16 are controlled to change the transmission ratio in accordance with the well known gear shift controller GS, 18. For automatic gear changing, the gear shift controller 18 receives operating parameters, for example loading on the engine, vehicle speed, engine speed, or the like. As a measure of loading of the engine, a signal representative of engine induction-type pressure or accelerator position may be used.

In accordance with the invention, the pressure controller 17 is controlled in dependence on a timing function. The pressure controller 17 is connected to a transfer switch 19, the switching position of which is controlled by a timing stage 22. In dependence on the setting of the switch 19, the pressure controlled by the pressure regulator is determined either by a control unit S, 20, or by a regulating unit R, 21.

The turbine or input speed signal $n_T$ and output speed signal $n_{out}$ from the transducers 14, 15 are connected to a transmission range determination unit 23. This unit, for example, essentially includes comparator elements comparing input and output speeds and providing signals representative thereof. The output from the transmission range determination unit 23 is applied, in one branch, to the timing stage 22 and, in another branch, to the regulator 21.

The regulator 21 is controlled from a memory 24 which stores, for example in an ROM, a plurality of characteristic curves which provide pressure-time relation functions to the regulator 21. These functions may be the same, or different for different gear ratio changes—for example first to second gear, second to third gear, etc.; and, additionally, the memory 24 may store curves of different gear change timing characteristics, as controlled by a mode selector switch 25.

Figure 2:
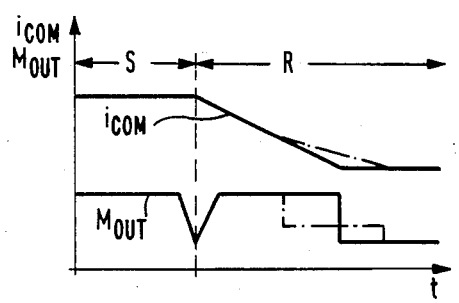
Figure 3:
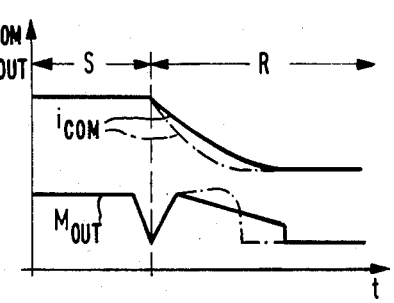

Operation, with reference to FIGS. 2 and 3: In accordance with a preferred feature of the invention, gear change is carried out in two phases, namely a control phase S and a regulating phase R. The control phase continues upon first sensing a gear shift or gear switching signal, until the free-wheeling point is reached. This is the point or the condition of the transmission in which the friction elements associated with the newly selected gear are to take over the whole torque while the friction elements associated with the previously engaged gear have been entirely loosened or disconnected.

Systems to recognize free-wheeling condition upon switch-over a stepped gear transmission, by themselves, are known, and published in the literature. One such system is described, for example, in German Patent Disclosure Document DE-OS No. 29 13 824 and corresponding U.S. Pat. No. 4,360,092.

Referring again to FIGS. 2 and 3: During the control phase S, pressure p is matched to the torque supplied by the engine. A relatively coarse matching is sufficient. The clutching torque, at the beginning of each gear change, of course must be greater than the torque to be supplied in the newly selected gear—assuming an upshift—so that a change of the transmission ratio within the gearing 10 results. On the other hand, however, the clutching torque should not be substantially greater than the torque transmitted in the previously engaged gear, in order to obtain good and smooth gear changing, without any switching jolts or shocks. A gear change of $\Delta i$ of, for example, 1.5, thus permits a tolerance band of about 40% for the pressure p.

The pressure control in the control phase S can be carried out as well known, for example by a strobed magnetic valve which, preferably, can be controlled additionally by a temperature sensor responsive to the temperature of the transmission fluid.

In accordance with another preferred embodiment of the invention, the timing stage 22 supervises if the freewheeling or neutral position within the transmission 12 has been reached since a gear change signal was applied thereto from the gear shift controller 18. If this is not the case, then the timing stage 22 provides an output signal to the control unit 20 which increases the pressure p in accordance with a ramp function, or any other predetermined function, until the freewheeling point has been reached. This timing interval, of course, should be so selected that, in normal and ordinary gear change operations, the freewheeling point is reached before this timing interval has elapsed. Of course, the timing interval could be changeable, for example as a function of transmission oil temperature. Oil temperature can be signalled to timing stage 22, for example, from a temperature sensor, as well known, at terminal 22a. Free-wheeling condition is signalled to timing stage 22 from terminal 22b, or can be signalled through the gear shift controller 18.

Change in the transmission ratio i will actually occur only during the regulating phase R. In accordance with a feature of the invention, the actually pertaining transmission condition $i_{act}$ is sensed by the transducers 14, 15 by effecting a comparison, as determined by the transmission range determination unit 23. The memory, typically an ROM, 24 stores therein characteristic curves of a commanded or desirable transmission relationship $i_{com}$ with respect to time, that is, curves which may be termed representative of "smoothness of shifting" or "smoothness of gear engagement". These curves, which may be a family of curves, may be different for any specific gear ratio change; if the transmission is so arranged that changes between respective steps are the same, then a single curve may suffice. A single command value or command relationship or command curve is particularly suitable if the steps between the various transmission ranges in the gears of the transmission 12 are all the same.

The timing illustrated in FIG. 2 shows first the control phase S, which is fixed as far as engaged gear is concerned, and then the regulating phase R, during which a commanded engagement transmission ratio is predetermined. In a simple form, this is a straight line, as shown by the solid curve of FIG. 2. The timing circuit T, at the termination of the disengaging phase during the control phase S, changes over the switch 19 to the regulating phase, so that the regulator 21 will control the pressure p within the transmission 12 in such a manner that the actual transmission relationship $i_{act}$ corresponds to the commanded transmission relationship $i_{com}$, in other words, to control the slippage during engagement in accordance with the curve shown in FIG. 2. The corresponding course of the output drive torque $M_{out}$ is illustrated in the lower curve of FIG. 2. In order to decrease the torque step at the end of the shifting, it is possible to modify the transmission command curve as illustrated in the chain-dotted line of the transmission change, that is, to make the engagement curve non-linear. The output torque will then change in a stepped form, as shown by the lower chain-dotted curve $M_{out}$. At the cost of somewhat greater complexity of the stored function in the memory, softer or more gradual gear change is obtained.

The linear relationship of the curve of FIG. 2 is not required, and any other non-linear function may be provided for the command value $i_{com}$. FIG. 3 illustrates a non-linear relationship, in which the command value $i_{com}$ is so arranged that, with respect to time, the output torque $M_{out}$ will have a course, over time, in accordance with selected changes. The gear changing time, thus, can be selectively controlled, for optimum timing, and/or operator preference. The mode selector switch 25, associated with the memory 24, permits selecting different gear changing curves, so that the operator, by suitable positioning of the selector switch 25, can select either a smoothly varying, gradually engaging gear shifting mode, or a rather sporty, high-acceleration mode. The solid-line curve illustrated in FIG. 3, which is somewhat equivalent to the chain-dotted curve of FIG. 2, shows a gear change relationship—with respect to time—associated with minimum gear change shock or jolt, and maximum passenger and operator comfort; the chain-dotted line, however, shows gear change engagement for maximum acceleration with short gear change intervals, and lesser riding comfort, however. The lower curve of FIG. 3, as in FIG. 2, illustrates the respective transmission output torques $M_{out}$, in solid-line and chain-dotted line representation corresponding to the respective actual transmission ratio, and roughly corresponding to the friction band engagement pressures, drawn in the top curve portions of FIG. 3.

Various changes and modifications may be made, and features described in connection with any one of the embodiments may be used with any of the others, within the scope of the inventive concept.

We claim:

1. Pressure-operated automotive automatic transmission (12) containing transmission fluid under pressure therein, and having an input shaft and an output shaft, whose respective rotational speeds define a transmission ratio (i),
    a transmission fluid pressure regulator (17),
    input speed sensing means (14) for sensing the speed of the input shaft to the transmission and delivering a transmission input speed signal (nT);
    output speed sensing means (15) for sensing the speed of the output shaft of the transmission and delivering a transmission output speed signal ($n_{out}$);
    pressure control means (19,20,21) responsive to the input speed signal (nT) and the output speed signal (nout) and continuously varying the pressure (p) of said fluid within the transmission;
    and a timing circuit means (22,T,24) connected to and controlling the pressure control means (19,20,21) said pressure control means controlling the fluid pressure regulator (17), in accordance with a predetermined time-varying control function ($i_{com}$), said fluid pressure regulator controlling said transmission ratio (i) of the transmission during a gear shifting operation.

2. Transmission according to claim 1, further comprising a plurality of gears, no more than one of which is selectively engaged at any given time, and each of which has associated friction elements, and wherein said timing circuit means (T) has two timing phases,
    a first timing phase forming a control phase (S) and extending from disengagement of a previously engaged gear until the transmission reaches a free-wheeling point at which friction elements of a newly selected gear are ready for engagement, and
    a second timing phase forming a regulating phase (R) in which a newly selected gear is gradually coupled between the input and output shafts of the transmission.

3. Transmission according to claim 2, wherein said timing circuit means (T) comprises
    a time-coupling relationship memory (24), said memory controlling the time-varying control function effected by the pressure control means (19,20,21) acting on the fluid pressure controller (17).

4. Transmission according to claim 1, wherein the transmission includes a plurality of gear sets with at least approximately equal changes of transmission ratio (i) between respective transmission gearing arrangements;
    and wherein the predetermined timing function ($i_{com}$) is the same for all equally stepped changes in the transmission.

5. Pressure-operated automotive automatic transmission (12) containing transmission fluid under pressure therein, and having an input shaft and an output shaft, whose respective rotational speeds define a transmission ratio (i),
    a transmission fluid pressure regulator (17),
    input speed sensing means (14) for sensing the speed of the input shaft to the transmission and delivering a transmission input speed signal ($n_T$);
    output speed sensing means (15) for sensing the speed of the output shaft of the transmission and delivering a transmission output speed signal ($n_{out}$);
    pressure control means (19,20,21) responsive to the input speed signal ($n_T$) and the output speed signal ($n_{out}$) and controlling the pressure (p) of said fluid within the transmission;
    a timing circuit means (22,T,24) connected to and controlling the pressure control means (19,20,21), said pressure control means controlling the fluid pressure regulator (17), in accordance with a predetermined time-varying control function ($i_{com}$), said fluid pressure regulator controlling said transmission ratio (i) of the transmission during a gear shifting operation;
    a plurality of gears, no more than one of which is selectively-engaged at any given time, and each of which has associated friction elements, and wherein said timing circuit means (T) has two timing phases, a first timing phase forming a control phase (S) and extending from disengagement of a previously engaged gear until the transmission reaches a free-wheeling point at which friction elements of a newly selected gear are ready for engagement, and a second timing phase forming a regulating phase (R) in which a newly selected gear is gradually coupled between the input and output shafts of the transmission and wherein said timing circuit means (T) is connected to receive a signal (22b) indicating a free-wheeling point at which friction elements of previously engaged gears have been disconnected and friction elements of a newly selected gear are ready for engagement;
    and wherein the timing circuit means controls the control and regulating means (19,20,21) to increase transmission fluid pressure if, within a preset time interval as determined by said timing means, the free-wheeling point signal is not received by the timing circuit means.

6. Transmission according to claim 3, wherein the time-coupling relationship memory (24) comprises a plurality of characteristics of respectively different timing-coupling engagement characteristics;

and a selector switch (25) is provided for permitting external control of a predetermined selected time-coupling relationship, to permit, selectively, soft, gradual coupling of the transmission for maximum passenger comfort, or rapid engagement for maximum acceleration.

* * * * *